United States Patent
> King

[15] 3,674,730
[45] July 4, 1972

[54] POLYVINYL CHLORIDE COMPOSITION

[72] Inventor: Laurence F. King, Mooretown, Ontario, Canada

[73] Assignee: Esso Research and Engineering Company

[22] Filed: Oct. 21, 1970

[21] Appl. No.: 82,727

[52] U.S. Cl. ............260/23 XA, 260/45.7 P, 260/45.75 R, 260/45.85, 260/45.95, 260/899
[51] Int. Cl.......................................C08f 29/18, C08f 45/62
[58] Field of Search ....................260/23 XA, 45.75 R, 45.85

[56] References Cited

UNITED STATES PATENTS

| | | | |
|---|---|---|---|
| 2,387,571 | 10/1945 | Fikenstscher et al. | 260/45.95 |
| 3,054,771 | 9/1962 | Hiestand et al. | 260/23 |
| 2,274,555 | 2/1942 | Japs | 260/45.85 |
| 3,069,400 | 12/1962 | Halpern | 260/87.5 |
| 3,167,533 | 1/1955 | Donat | 260/86.3 |
| 2,156,956 | 5/1939 | Agens | 260/45.85 |
| 2,180,730 | 11/1939 | Cox | 260/45.85 X |
| 2,511,811 | 6/1950 | Baer | 260/23 |
| 2,514,424 | 7/1950 | Smith | 260/45.85 X |
| 2,624,716 | 1/1953 | Smith | 260/45.85 X |
| 2,906,719 | 9/1959 | Jankowiak et al. | 260/45.85 X |
| 3,127,366 | 3/1964 | Zaremsky | 260/23 |

OTHER PUBLICATIONS

Smith, " Stabilizers for Vinyl Polymers" British Plastics, May 1954 pages 176–179

*Primary Examiner*—Donald E. Czaja
*Assistant Examiner*—Donald J. Barrack
*Attorney*—Chasan & Sinnock and Harold Einhorn

[57] ABSTRACT

Polyvinyl halide extrusion-blow molding compositions containing calcium-magnesium-zinc stabilizers are improved by the addition of long chain alcohols and esters of long chain hydroxy acids. Clear rigid film and containers of improved clarity and freedom from yellowness, when extruded and blow molded at normal temperatures, are produced.

4 Claims, 3 Drawing Figures

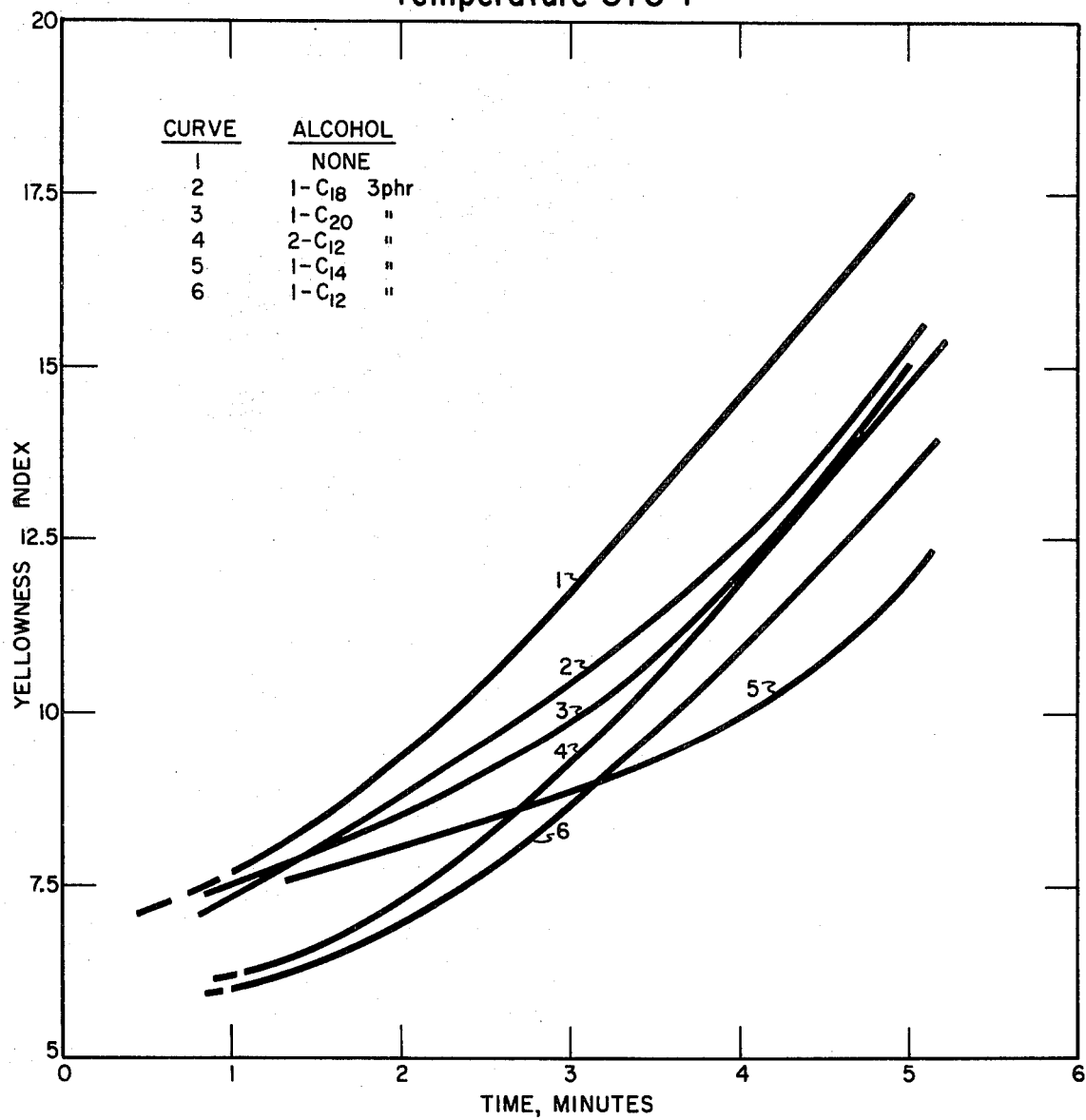

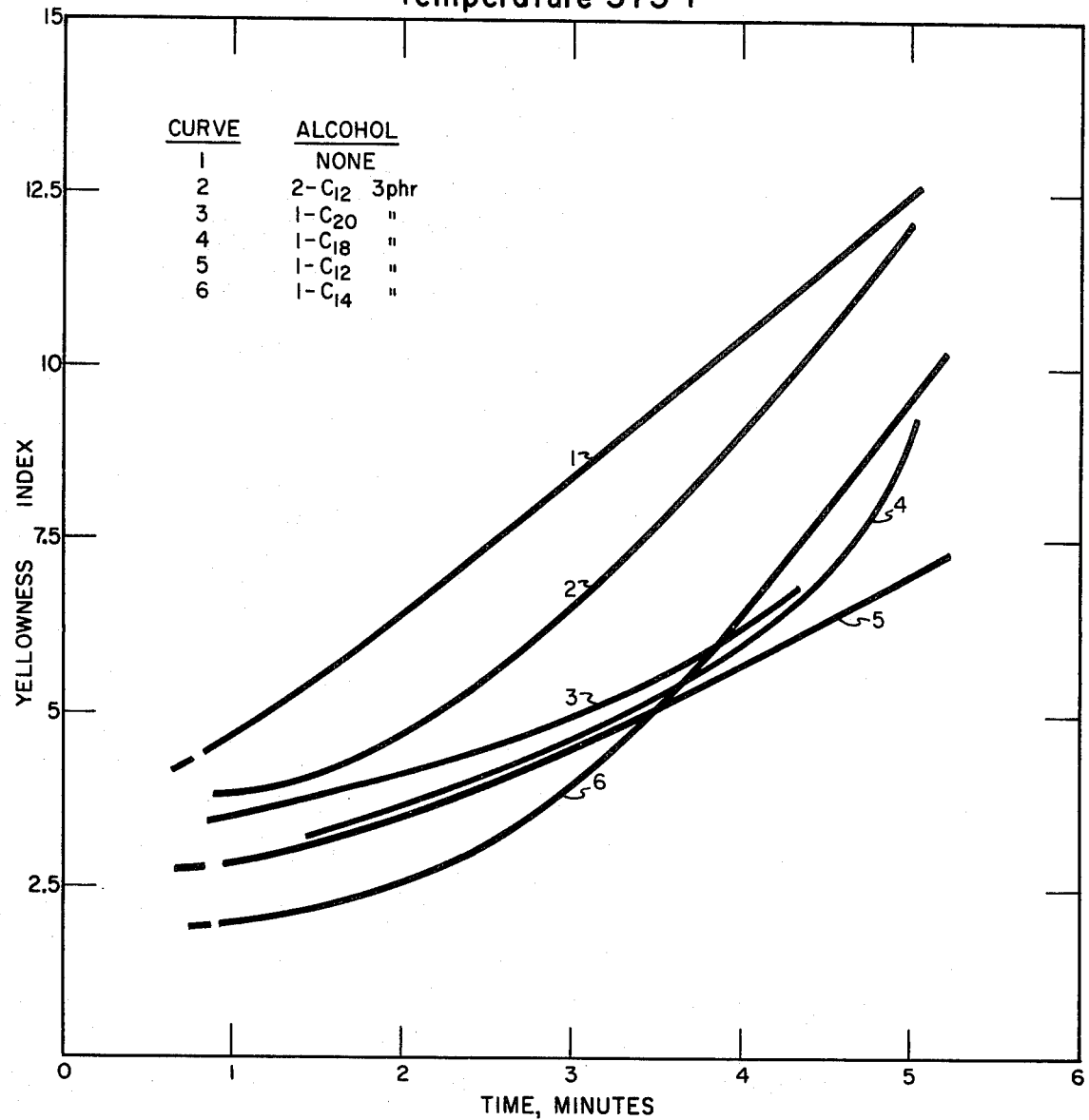

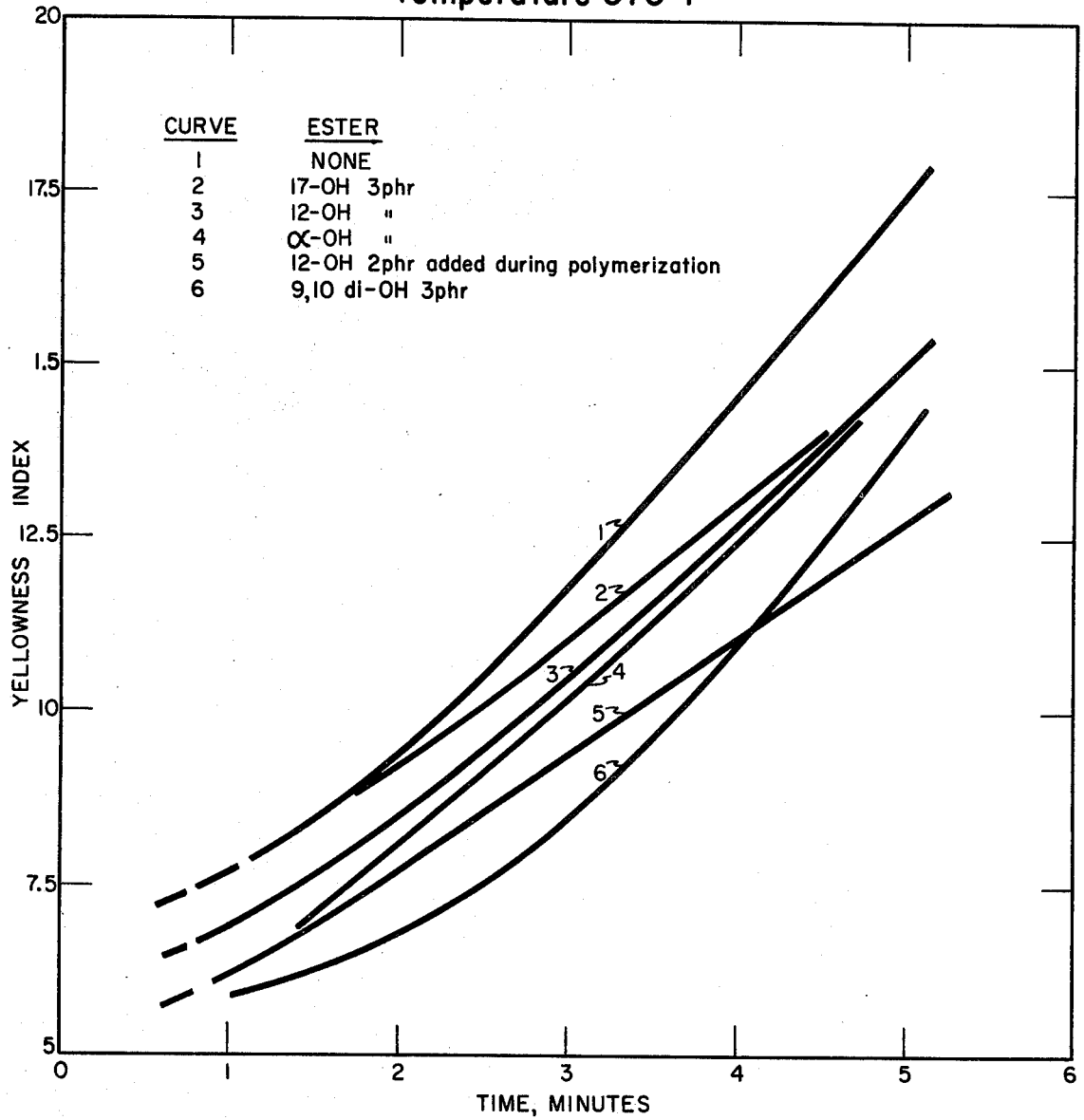

POLYVINYL CHLORIDE COMPOSITION

THE PRIOR ART

It is generally known that severe exposure of such resinous materials as polyvinyl chloride and copolymers thereof to heat and/or light brings about discoloration, brittleness and loss of strength. Exposure to high temperatures frequently occurs during fabrication of the material, and exposure to light may occur throughout the life of the material. Numerous attempts have been made in the prior art to introduce stabilizers which will reduce or eliminate these deleterious effects on the polymer. Organotin compounds, because of their unusual heat stabilizing properties, are normally required in polyvinyl chloride extrusion-blow molding compositions in order to produce the best color and clarity in bottles, film, etc. However, for food packaging applications, organotin compounds have the disadvantage in generally being quite toxic. Two exceptions include di(n-octyl) tin maleate and di-octyl tin S—S' bis (iso-octyl mercaptoacetate). These are the only tin stabilizers currently approved for food use in the United States and Canada. Because these materials are extremely costly, it has been found desirable to find alternative stabilizers. Therefore, conventional calcium-zinc or magnesium-zinc stabilizers have generally been employed.

Great difficulties are encountered in producing bottles, film, etc., of good color and clarity when using these conventional stabilizers. Blue or violet toners mask the yellowing tendency to a limited extent but reduce the clarity when used in large enough amounts to be effective. Therefore, it has been found necessary to use additives in combination with these stabilizers to produce the desired results. To withstand processing temperatures of PVC without volatilization the additives should have boiling points in excess of 450° F. Additives which have been employed in the prior art include borate esters of polyhydric alcohols, epoxy-containing organic materials in combination with unsaturated esters of polycarboxylic acids, polyhydric primary aliphatic alcohols containing at least three hydroxy groups, aliphatic acid esters of polyhydric alcohols, etc. It has heretofore been considered necessary when employing alcohols as additives to have at least two, and preferably more, hydroxy groups present in a molecule.

THE PRESENT INVENTION

It has now been discovered that it is possible to use compounds selected from the group consisting of alcohols having a single hydroxy group and esters of long chain mono-or dihydroxy acids in combination with a mixture of the calcium, magnesium and zinc salts of organic acids as the stabilizing agent for vinyl halide polymers. The use of such a combination results in excellent heat stability for the polymer at processing temperatures as high as 400° F. The good processability is due mainly to a marked plasticizing or internal lubricating effect of these alcohols or esters on the particles in the polymer matrix, an effect which is evidenced by a lowering of the glass transition temperature and the melt viscosity of the polymer. Further, the color clarity of the product compares favorably with that obtained using the systems of the prior art. This is due to the employment of the three-component stabilizer system — calcium, magnesium and zinc — together with a long chain alcohol or ester. Since these alcohols and esters are non-toxic, products prepared using the present technique are readily adaptable for use in food packaging.

The vinyl halide polymers useful in the present invention include polyvinyl chloride, polyvinylidene chloride, copolymers containing vinyl chloride in a major proportion with other copolymerizable monomers such as vinyl formate, vinyl acetate, propylene, ethylene, butylenes, alkyl vinyl ethers, alkyl acrylates and methacrylates, alkyl maleates, alkyl fumarates, etc. The weight average molecular weight of the polyvinyl halide resin is in the range of about 50,000 to about 100,000, and preferably from about 65,000 to about 75,000.

The alcohols to be utilized as stabilizers in the process of this invention are alcohols having the following formula:

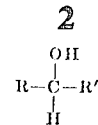

wherein R is a $C_6$—$C_{35}$ straight chain alkyl group and R' is hydrogen or a $C_6$–$C_{10}$ straight chain alkyl group, provided that if R' is hydrogen R must be at least $C_{12}$. That is, acceptable alcohols include primary and secondary aliphatic alcohols having a carbon number of at least 12 and not exceeding 45. Preferably, the carbon number range will be from 12 to 24. Examples of alcohols which are useful in the present invention include but are not limited to 1-dodecanol, 2-dodecanol, 1-tetradecanol, 1-hexadecanol, 1-octadecanol, 1-eicosanol ($C_{20}$) and higher molecular weight wax alcohols up to $C_{45}$. Preferably, the alcohol to be used will be one of the following: 1-tetradecanol, 1-hexadecanol, 1-octadecanol and 1-eicosanol.

The esters of long chain hydroxy acids applicable to the instant invention have the following formula:

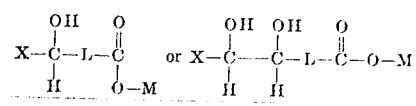

wherein X is hydrogen or a $C_1$—$C_{20}$ straight chain alkyl group, L is $C_0$ to a $C_{25}$ straight chain alkyl group, and M is a $C_1$ to $C_{10}$ alkyl group. Preferably, K is hydrogen to a $C_{20}$ alkyl group, L is $C_0$ to a $C_{20}$ alkyl group, and M is a $C_1$ to $C_5$ alkyl group. Esters falling within the scope of the above formula include methyl α-hydroxy stearate, ethyl 12-hydroxy stearate, butyl 17-hydroxy stearate, alkyl 9,10-dihydroxy stearates, amyl hydroxy laurates, propyl hydroxy myristates, methyl hydroxy palmitates, butyl hydroxy docosanoates. Examples of preferable esters include but are not limited to methyl α-hydroxy stearate, methyl 12-hydroxy stearate, methyl 17-hydroxy stearate and methyl 9,10-dihydroxy stearate.

The organic acids from which the complex calcium, magnesium and zinc salts may be derived are monocarboxylic acids, including aliphatic acids having at least six carbon atoms, aromatic acids, thio-acids, sulphonic acids and naphthenic acids. Specific examples include lauric acid, stearic acid, oleic acid, ricinoleic acid, benzoic acid, salicylic acid, phenyl acetic acid, diphenolic acid, thio-glycollic acid, maleic acid, naphthenic acid, erucic acid. Preferably, the acid will be selected from one of the following: stearic acid, ricinoleic acid, oleic acid, naphthenic acid.

A typical formulation for the vinyl halide polymer used in the practice of this invention consists of 100 parts of the vinyl halide polymer; 5–20 parts, preferably 15 parts, of an impact modifier such as e.g. acrylonitrile-butadiene styrene terpolymers, nitrile rubbers, methyl methacrylate butadiene-styrene terpolymers, etc.; and the stabilizer system of the instant invention wherein the hydroxy compound is present in from 1 to 10 parts, and preferably 2 to 4 parts, the calcium salt is present in proportions of about 0.01 to about 0.2 parts by weight, preferably 0.02 to 0.1 parts, the magnesium salt is present in proportions of about 0.1 to about 1.0 parts, preferably 0.2 to 0.6 parts, and the zinc salt is present in proportions of about 0.25 to about 2.5 parts, preferably 0.5 to 1.5 parts by weight. It is preferable also to add 1 to 10 parts of an epoxy compound such as octyl epoxy stearate, epoxidized linseed oil, epoxidized soybean oil, etc., and/or 0.5 to 1.5 parts of a phosphite chelator such as trisnonylphenyl phosphite.

Although the appropriate hydroxyl compounds of the instant invention may be added after polymerization of the vinyl halide monomer, it is preferable to add these materials during the polymerization. The procedure is illustrated by Example 3. Preaddition of appropriate ingredients insures more intimate mixing, thus providing better processability, color clarity and elimination of defects (undispersed particles) in the finished article, due to insufficienet shear during extrusion. Normally, the additives do not copolymerize with vinyl halide but are nonetheless effective. Alternatively, these ingredients may be added during the blending of the polymerized vinyl halide, preferably at temperatures in the range of the melting point of the hydroxy compound in order to insure good blending.

Processing temperatures for the polymers are generally in the range of 340° to 400° F., and preferably in the range of about 365° to 390° F. The stabilizing system of the instant invention has been found to impart excellent stability to the polymer at these temperatures.

The invention will be further understood by reference to the following description and examples.

EXAMPLE 1

A good correlation has been shown between the performance of a polyvinyl halide compound in a typical extrusion-blow molding operation and a dynamic stability test. This correlation may be demonstrated by the following comparison test. Bottles of polyvinyl chloride homopolymer were prepared by a typical extrusion-blow molding operation, the melt temperature of the extrudate being in the range 380° to 395° F. Sections of these bottles were then cut out and pressed to 0.02 inch thickness at 365° F. and evaluated for clarity in a spectrophotometer and for clarity and yellowness index in a colorimeter. Typical data are as follows:

| | |
|---|---|
| Light transmission (%) at 476 m$\mu$ | 82–84 |
| Absorbance at 476 m$\mu$ | 0.085–0.070 |
| Clarity ($Y_{CIE}$) | 68–72 |
| Yellowness Index | 9–5 |

The identical compound was then run on a 3-inch mill at 375° F., a temperature 5°–20° F. below that for extrusion-blow molding. This mill temperature was chosen to compensate for the greater oxidative effect of the atmosphere during milling. Samples were removed from the mill at suitable time intervals. The first specimens (taken at 5 minutes and pressed to 0.02 inch thickness) showed the following results:

| | |
|---|---|
| Light transmission (%) at 476 m$\mu$ | 82.5–86 |
| Absorbance at 476 m$\mu$ | 0.08–0.065 |
| Clarity ($Y_{CIE}$) | 69–72 |
| Yellowness Index | 7.5–4.5 |

These data are seen to be in good agreement with those from blow molding. It is clear then that dynamic mill stability tests provide a good experimental approach toward determining the characteristics of extrusion-blow molding compounds.

EXAMPLE 2

Tables I and II, below, illustrate the improved color clarity obtained for various vinyl halide polymers by the use of the hydroxyl compound stabilizers of the instant invention. In each case, identical calcium-magnesium zinc salts were present in 1.45 parts per hundred of resin (phr) and the hydroxyl additives in 1.5 phr (Table I) and 3 phr (Table II). Results obtained are from a dynamic mill stability test using a 3 inch mill at 375° F. Specimens were taken after 5 minutes (Table I) and 1, 2, 3, 4 and 5 minutes (Table II), and pressed to 0.02 inch thickness. The polymers used are identified in Table III and specific identifying properties set forth.

TABLE I

[Effect of hydroxyl compounds on initial yellowness]

| | A [1] | | B | | C | | D | | E [1] | |
|---|---|---|---|---|---|---|---|---|---|---|
| | Yellowness index [2] | Percent decrease in yellowing | Yellowness index [2] | Percent decrease in yellowing | Yellowness index [2] | Percent decrease in yellowing | Yellowness index [2] | Percent decrease in yellowing | Yellowness index [2] | Percent decrease in yellowing |
| No hydroxyl compound present | 7.5 | | 17.5 | | 16.5 | | 15 | | 4.5 | |
| 1-octadecanol | 5.5 | 27 | 11 | 37 | 14 | 15 | 12 | 20 | | |
| Methyl 12-hydroxy stearate | 4 | 47 | 13 | 26 | 15.5 | 6 | 15 | 0 | 2.0 | 55 |
| 12-hydroxy stearic acid | 13 | [3] 70 | | | | | | | | |

[1] Contains trace of bluing agent to mask initial yellowing. Samples from mill after 5 minutes.

[2] As measured by ASTM D1925-63T: $YI = \dfrac{100(1.28\ X_{CIE} - 1.06\ Z_{CIE})}{Y_{CIE}}$ where X, Y and Z are CIE tristimulus values for red, green (brightness or clarity) and blue, respectively.

[3] Increase.

TABLE II

[Effect of hydroxyl compounds on initial yellowness]

| | A | | A' | | B | | D | | E | | F | |
|---|---|---|---|---|---|---|---|---|---|---|---|---|
| | Yellowness index (avg.)[1] | Percent Decrease in yellowing | Yellowness index (avg.)[1] | Percent decrease in yellowing | Yellowness index (avg.)[1] | Percent decrease in yellowing | Yellowness index (avg.)[1] | Percent decrease in yellowing | Yellowness index (avg.)[1] | Percent decrease in yellowing | Yellowness index (avg.)[1] | Percent decrease in yellowing |
| No hydroxyl compound present | 12 | | | | 8 | | 8.5 | | 7 | | 7.5 | |
| 1-dodecanol | 8.5 | 30 | | | 7 | 12 | 4.5 | 50 | 5.5 | 20 | 7.5 | 0 |
| 2-dodecanol | 9.5 | 20 | | | | | 6.5 | 25 | | | | |
| 1-tetradecanol | 9 | 25 | | | 7 | 12 | 4 | 50 | 5.5 | 20 | | |
| 1-octadecanol | 10 | 15 | | | 5.5 | 30 | 4.5 | 45 | 5 | 30 | 7.5 | 0 |
| 1-eicosanol | 10 | 15 | | | 7.5 | 5 | 5 | 40 | 7.5 | [3] 5 | 7 | 5 |
| Methyl α-hydroxy stearate | 10.5 | 12 | | | 10 | [3] 15 | 9 | [3] 5 | 9 | [3] 30 | 9.5 | [3] 25 |
| Methyl 12-hydroxy stearate | 10.5 | 12 | [2] 9.5 | 20 | 7 | 12 | 6.5 | 25 | 6.5 | 5 | 8 | [3] 7 |
| Methyl 17-hydroxy stearate | 11 | 8 | | | 7.5 | 5 | 7.5 | 12 | | | | |
| Methyl 9,10-dihydroxy stearate | 8.5 | 30 | | | 8.5 | [3] 5 | 7.5 | 12 | 7 | 0 | 9.5 | [3] 25 |

[1] 3-minute samples from smooth curve taken as "average".

[2] 2 parts ester added before polymerization.

[3] Increase.

TABLE III

[Properties of polyvinyl halide resins]

| | PVC homopolymers | | | | | PVC copolymers | |
|---|---|---|---|---|---|---|---|
| | A | A[1] | B | C | D | E | F |
| | Regular | (1) | High porosity | Regular | High density | Regular | Regular |
| Comonomer, wt. percent | | | | | | [2] (2.7) | [3] (2.0) |
| K-value | 60 | 61 | 59 | 61.6 | 63.4 | 59.5 | 60 |
| Powder density, g./cc | 0.53 | 0.58 | 0.51 | 0.48 | 0.72 | 0.52 | 0.53 |
| Glass transition temp.. °C | 78 | 68 | 78 | 79 | 78 | 75 | 72 |
| Particle size: | | | | | | | |
| Medium mm | 0.120 | 0.085 | 0.084 | 0.135 | 0.074 | | |
| Distribution coefficient | 0.183 | 0.664 | 0.137 | 0.196 | 0.588 | | |
| Percent retained on— | | | | | | | |
| 60 mesh | Trace | 5 | 0.2 | 1.4 | 0.6 | Nil | 0.2 |
| 80 mesh | 0.6 | | | 4.2 | | 22 | 1.8 |
| 100 mesh | 11 | 13 | 0.2 | 26 | 12.4 | 25 | 11 |
| 140 mesh | 64 | 18 | 2.8 | 54 | 15 | 45 | 58 |
| 200 mesh | 23 | 22 | 79 | 14 | 23 | 6 | 26 |
| 275 mesh | | 16 | | | 26 | | |
| 325 mesh | | 14 | 2 | | 13 | | |
| Pan | 1.4 | 12 | Trace | 0.4 | 10 | 2 | 3 |

[1] 2 parts methyl 12-hydroxy stearate added during polymerization.
[2] Propylene.
[3] Alkyl vinyl ether.

EXAMPLE 3

600 g. vinyl chloride were charged to an autoclave, along with 1,200 g. water containing dissolved therein 1.5 g. hydroxy ethyl cellulose (15,000 M.W.) as suspending agent. Methyl 12-hydroxy stearate (12 g) was added and then 0.8 g 50 percent solution of caprylyl peroxide initiator in toluene. The reaction temperature was 140° F. Initial pressure was 150 psi and polymerization proceeded normally to a final pressure of 70 psi after 20 3/4 hours. Polymer yield was 90 percent.

Properties of the product are listed under PVC Homopolymer A' of Table III. Although the K-value (molecular weight) of A' was essentially the same as resin A to which no methyl 12-hydroxy stearate was added, the glass transition temperature of A' was lower by 10° C., thus yielding a resin of better processability. In this respect polymer A' was superior even to the copolymers E and F of Table III which had glass transition temperatures only 3° and 6° C. lower, respectively, than the homopolymer. Mill test data are included in Tables II and IV.

EXAMPLE 4

The dynamic mill stability test provides additional information of value. By removing samples from the mill at various times during the 5 minute period, under the same conditions as stated previously, and evaluating these samples for color clarity, a continuous measure of the heat stability of various polymers with and without the hydroxy compound stabilizers can be determined. FIGS. 1, 2 and 3 represent plots of the yellowness index of samples milled under the conditions shown above for various time periods. The rate of thermal degradation is given by the slope of the curve at the mid-point 3 minutes. A low value of the slope corresponds to a high degree of operational latitude in processing. This is most desirable in practice since a large number of operating variables must be closely controlled.

The thermal stability data based on the slopes of the yellowness index vs. time curves are summarized in Table IV.

It is clear from the above description and data that not only initial color clarity but dynamic heat stability of vinyl halide polymers (at a constant temperature) were appreciably increased by the use of the stabilizer systems of the instant invention. Although the mechanism is not fully understood, it is due at least in part to the unexpected plasticizing and lubricating effects of the hydroxy additives on the polymer particles at the processing temperature. The effect of the monoalcohols and esters on the glass transition temperature of the polymer and the concomitant lowering of melt viscosity at about the processing temperature, provide 15°–25° F. lower stock temperatures in extrusion-blow molding with the result that product color and clarity are even better than predicated by mill tests. The lowering of the glass transition temperature is shown in Table V (at a concentration in PVC) as determined by differential scanning calorimetry. The alcohols and hydroxy esters of the instant invention induce a glass transition temperature lowering ($\Delta T_g$) generally greater than conventional plasticizers (phthalates). On the other hand, the free hydroxy acids have a negligible effect on the glass transition temperature, and it has been shown that 12-hydroxy stearic acid promotes yellowing and loss of clarity in PVC (Table I), as is also well known in the art for other acids such as stearic and oleic acids.

TABLE V

EFFECT OF ADDITIVES ON GLASS TRANSITION TEMPERATURE ($T_g$) OF PVC HOMOPOLYMERS

| | Lowering of Polymer $T_g$ $\Delta T_g$ (°C.) Per 5 Parts Additive by Weight |
|---|---|
| Alcohols of Instant Invention | |
| 1-Dodecanol | 20 |
| 2-Dodecanol | 20 |
| -Tetradecanol | 16.5 |
| 1-Octadecanol | 11 |
| 1-Eicosanol | 11 |

TABLE IV

[Effect of hydroxyl compounds on rate of yellowing]

| | A | | A[1] | | B | | D | | E | | F | |
|---|---|---|---|---|---|---|---|---|---|---|---|---|
| | Slope at 3 mins.[1] | Percent decrease in slope | Slope at 3 mins.[1] | Percent decrease in slope | Slope at 3 mins.[1] | Percent decrease in slope | Slope at 3 mins.[1] | Percent decrease in slope | Slope at 3 mins.[1] | Percent decrease in slope | Slope at 3 mins.[1] | Percent decrease in slope |
| No hydroxyl compound present | 2.6 | | | | 3.2 | | 1.6 | | 0.9 | | 1.7 | |
| 1-dodecanol (C$_{12}$) | 2.2 | 15 | | | 2.4 | 25 | 1.3 | 20 | 1.2 | [3] 30 | 1.7 | 0 |
| 2-dodecanol (C$_{12}$) | 2.5 | 5 | | | | | 2.0 | [3] 25 | | | | |
| 1-tetradecanol (C$_{14}$) | 1.0 | 60 | | | 1.5 | 55 | 2.0 | [3] 25 | 1.7 | [3] 85 | | |
| 1-octadecanol (C$_{18}$) | 2.1 | 20 | | | 1.5 | 55 | 1.3 | 20 | 0.4 | 55 | 1.6 | 5 |
| 1-eicosanol (C$_{20}$) | 1.9 | 25 | | | 2.5 | 20 | 1.1 | 30 | 0.7 | 20 | 1.1 | 35 |
| Methyl α-hydroxy stearate | 2.3 | 10 | | | 1.3 | 60 | 0.9 | 40 | 1.2 | [3] 30 | 1.5 | 10 |
| Methyl 12-hydroxy stearate | 1.8 | 30 | [2] 1.7 | 35. | 1.6 | 50 | 0.9 | 40 | 1.1 | [3] 20 | 0.8 | 50 |
| Methyl 17-hydroxy stearate | 1.8 | 30 | | | 1.6 | 50 | 1.2 | 25 | | | | |
| Methyl 9,10-dihydroxy stearate | 1.8 | 30 | | | 2.5 | 20 | 1.4 | 15 | 1.0 | [3] 10 | 0.9 | 45 |

[1] Slope of yellowness index vs. time curve at 3 minutes. Indicates thermal stability under shear.
[2] 2 parts ester added before polymerization.
[3] Increase.

Esters of Instant Invention
- Methyl α-Hydroxy Stearate — 22
- Methyl 12-Hydroxy Stearate — 24
- Methyl 17-Hydroxy Stearate — 22.5
- Methyl 9,10-Dihydroxy Stearate — 19

Conventional Plasticizers
- Di-2-Ethyl Hexyl Phthalate — 16
- Butyl Benzyl Phthalate — 15

Free Acids
- Hydroxy Stearic Acids — 2
- 9,10 Dihydroxy Stearic Acid — 1

Comonomers of Vinyl Chloride
- Propylene (Example E) — 6
- Alkyl Vinyl Ether (Example F) — 19

The relationship between plasticizing effect ($\Delta T_g$) and improvement in heat stability during processing is substantiated by reference to the experimental data on copolymers E and F. The copolymers already contain plasticizing and lubricating moities - propylene and alkyl vinyl ether. Therefore, the effect of the additives of the instant invention is less for copolymers than for homopolymers, though still significant.

While these examples adequately illustrate the invention, it should be understood that the present invention in its broadest aspects is not necessarily limited to the specific materials, conditions and procedures shown therein. The present invention is limited only by the claims which follow.

What is claimed is:

1. A stabilized resin composition which comprises as a major constituent a vinyl halide polymer and as the stabilizing agent a mixture of the calcium, magnesium and zinc salts of organic acids in combination with an ester of a long chain hydroxy acid having the following formula:

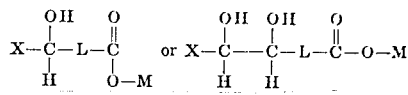

wherein X is hydrogen or a $C_1$—$C_{20}$ straight chain alkyl group, L is $C_0$ to a $C_{25}$ straight chain alkyl group, and M is a $C_1$ to $C_{10}$ alkyl group.

2. The composition of claim 1 wherein the ester is selected from the group consisting of methyl 12-hydroxy stearate, methyl α-hydroxy stearate, methyl 17-hydroxy stearate, and methyl 9,10-dihydroxy stearate.

3. The composition of claim 1 wherein the vinyl halide polymer is selected from the group consisting of polyvinyl chloride and a vinyl chloride-propylene copolymer wherein vinyl chloride monomer is the major constituent.

4. The composition of claim 1 wherein, measured per 100 parts by weight of polymer, the calcium salt is present in amounts of about 0.01 to about 0.2 parts, the magnesium salt is present in amounts of about 0.1 to about 1.0 parts, the zinc salt is present in amounts of about 0.25 to about 2.5 parts by weight and the ester is present in amounts of about 1 to about 10 parts.

* * * * *